(12) United States Patent
Samo

(10) Patent No.: US 10,697,756 B2
(45) Date of Patent: Jun. 30, 2020

(54) 3D SCANNING SYSTEMS

(71) Applicant: Delavan Inc, West Des Moines, IA (US)

(72) Inventor: Joseph Samo, Johnston, IA (US)

(73) Assignee: Delavan Inc., West Des Moines, IA (US)

(*) Notice: Subject to any disclaimer, the term of this patent is extended or adjusted under 35 U.S.C. 154(b) by 0 days.

(21) Appl. No.: 15/266,489

(22) Filed: Sep. 15, 2016

(65) Prior Publication Data

US 2018/0073859 A1 Mar. 15, 2018

(51) Int. Cl.
| | |
|---|---|
| *G01B 11/02* | (2006.01) |
| *H04N 13/20* | (2018.01) |
| *H04N 13/204* | (2018.01) |
| *G01B 11/24* | (2006.01) |
| *G01B 5/00* | (2006.01) |
| *G01B 21/04* | (2006.01) |

(52) U.S. Cl.
CPC ............ *G01B 11/02* (2013.01); *G01B 5/0007* (2013.01); *G01B 11/24* (2013.01); *G01B 21/047* (2013.01); *H04N 13/204* (2018.05); *G01B 2210/52* (2013.01); *H04N 2213/001* (2013.01)

(58) Field of Classification Search
CPC ........ G03F 7/2051; G01N 21/00; A47K 1/00; G01H 9/00; G01B 11/161; G01B 11/25; G01B 11/02; G01B 11/24; G01B 21/047; G01B 5/0067; G01B 2210/52; H04N 13/204; H04N 2213/001
See application file for complete search history.

(56) References Cited

U.S. PATENT DOCUMENTS

| | | | | |
|---|---|---|---|---|
| 3,732,722 | A * | 5/1973 | Norem | G01N 25/486 374/12 |
| 3,798,792 | A * | 3/1974 | Askew | G09B 7/066 434/169 |
| 4,364,182 | A | 12/1982 | Jones | |
| 5,107,599 | A * | 4/1992 | Marincic | G01B 5/0004 269/309 |
| 5,193,286 | A | 3/1993 | Collier | |
| 5,479,106 | A * | 12/1995 | Takahashi | G01R 1/071 324/750.16 |
| 5,735,056 | A * | 4/1998 | Gosine | B23Q 16/004 33/568 |
| 7,113,878 | B1 * | 9/2006 | Loferer | G01B 21/042 702/104 |

(Continued)

OTHER PUBLICATIONS

Partial European Search Report, of the European Patent Office, dated Nov. 7, 2017 in corresponding European Patent Application No. EP17190991.4.

(Continued)

*Primary Examiner* — Sang H Nguyen
(74) *Attorney, Agent, or Firm* — Locke Lord LLP; Daniel J. Fiorello; Scott D. Wofsy

(57) ABSTRACT

A plate for a 3D scanning system can include a plate body configured to mount to a 3D scanning system, and a plurality of artifact alignment apertures defined in the plate body arranged in a predetermined pattern to allow a predetermined mounting arrangement of one or more artifacts. The artifact alignment apertures are configured to allow an artifact to be mounted to the plate body.

12 Claims, 6 Drawing Sheets

(56) References Cited

U.S. PATENT DOCUMENTS

| | | | | |
|---|---|---|---|---|
| 7,197,836 B2* | 4/2007 | Kikuti | ................ | G01B 21/042 |
| | | | | 33/1 CC |
| 7,869,026 B2* | 1/2011 | Boyer | ................ | G01B 21/042 |
| | | | | 356/243.1 |
| 8,140,295 B2* | 3/2012 | Hebert | ................ | G01B 11/245 |
| | | | | 356/603 |
| 9,998,729 B2* | 6/2018 | Lilien | ................ | G01B 11/24 |
| 2005/0218280 A1* | 10/2005 | Rojas | ................ | A47F 5/0815 |
| | | | | 248/220.31 |
| 2006/0026852 A1 | 2/2006 | Kikuti | | |
| 2006/0180931 A1* | 8/2006 | Luo | ................ | H01L 21/568 |
| | | | | 257/758 |
| 2006/0181700 A1* | 8/2006 | Andrews | ................ | G01N 21/21 |
| | | | | 356/237.2 |
| 2010/0054408 A1* | 3/2010 | Echner | ................ | A61N 5/1042 |
| | | | | 378/65 |
| 2010/0229422 A1* | 9/2010 | Goonetilleke | ....... | A61B 5/1074 |
| | | | | 36/43 |
| 2013/0278725 A1* | 10/2013 | Mannan | ............. | G06F 17/5086 |
| | | | | 348/46 |
| 2013/0313339 A1* | 11/2013 | Carpenter | ............ | F02M 61/168 |
| | | | | 239/548 |
| 2016/0025644 A1* | 1/2016 | Nygaard | ............. | G01N 21/909 |
| | | | | 356/625 |

OTHER PUBLICATIONS

Extended European Search Report, of the European Patent Office, dated Feb. 12, 2018 in corresponding European Patent Application No. EP17190991.4.

* cited by examiner

3D SCANNING SYSTEMS

BACKGROUND

1. Field

The present disclosure relates to scanning systems, more specifically to 3D scanning systems.

2. Description of Related Art

An optical 3D scanner is used to scan piece parts and check for non-conformances on prototype parts, for example. Existing systems force the user of the scanning machine to change the setup for each part which is time consuming and challenging considering the variation in the parts. For example, each different part requires creating a new fixture or way of holding the part and a new program for operation of the machine. In certain cases, some parts lack unique features that are needed for scan to scan matching. Currently, various ways are used to hold these parts, e.g., hot glue, gage vises, clamps, custom fixtures, etc., as the existing machines comes equipped only with a simple flat plate with a grid of threaded mounting holes.

Such conventional methods and systems have generally been considered satisfactory for their intended purpose. However, there is still a need in the art for improved scanning systems. The present disclosure provides a solution for this need.

SUMMARY

A plate for a 3D scanning system can include a plate body configured to mount to a 3D scanning system, and a plurality of artifact alignment apertures defined in the plate body arranged in a predetermined pattern to allow a predetermined mounting arrangement of one or more artifacts. The artifact alignment apertures are configured to allow an artifact to be mounted to the plate body.

The predetermined pattern can include a plurality of rows and columns. The plate can include position indices on a surface of the plate body and associated with at least one of the plurality of rows and/or columns. The position indices can include a plurality of letters for one of the plurality of rows or columns, and a plurality of numbers for the other of the plurality of rows or columns.

The plate can further include a plurality of mounting apertures disposed in the plate body configured to allow mounting of one or more holding fixtures and/or parts. The plate can further include one or more artifacts attached to the plate body.

In accordance with at least one aspect of this disclosure, a 3D scanning system can include a plate as described above. The system can further include one or more artifacts, e.g., attached to the plate body.

At least one of the one or more artifacts can include an artifact body and a mounting flange. In certain embodiments, the artifact body can include a multi-sided post. Any suitable shape, size, and/or features are contemplated herein for one or more of the artifacts.

In certain embodiments, at least one of the one or more artifacts can include a frustum tip. For example, the frustum tip can include an octagonal frustum. In certain embodiments, at least one of the one or more artifacts can include a mirrored frustum defined in the artifact body. The one or more artifacts can include an imaging target (e.g., a sticker, a painted target) configured to allow imaging software to determine an orientation of the part as a function of each imaging target on each artifact.

In accordance with at least one aspect of this disclosure, a method for creating a 3D image of a part can include placing one or more artifacts on a plate, and mounting a part to the plate in a predetermined location relative to the one or more artifacts. Placing the one or more artifacts and/or mounting the part can include using and/or recording indices on the plate that indicate a position of the one or more artifacts and/or the part.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
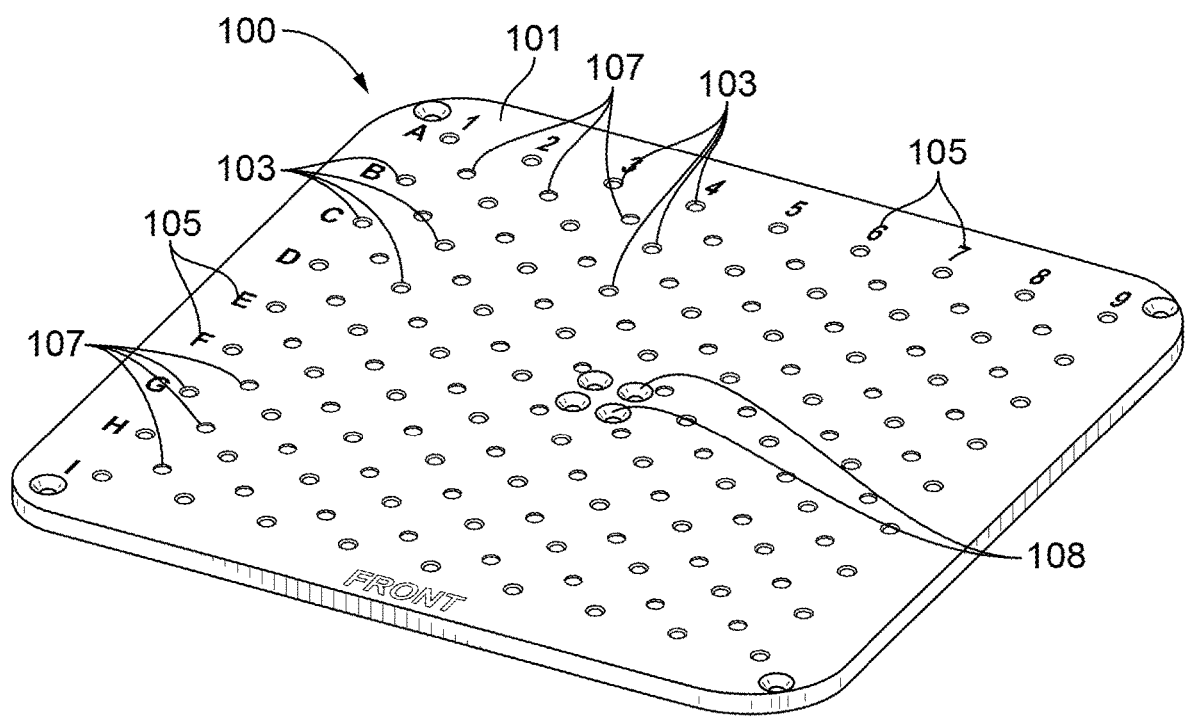
FIG. 1 is a perspective view of an embodiment of a plate in accordance with this disclosure.

Reference will now be made to the drawings wherein like reference numerals identify similar structural features or aspects of the subject disclosure. For purposes of explanation and illustration, and not limitation, an illustrative view of an embodiment of a plate in accordance with the disclosure is shown in FIG. 1 and is designated generally by reference character 100. Other embodiments and/or aspects of this disclosure are shown in FIGS. 2-4C. The systems and methods described herein can be used to simplify 3D imaging of parts.

Figure 3A:
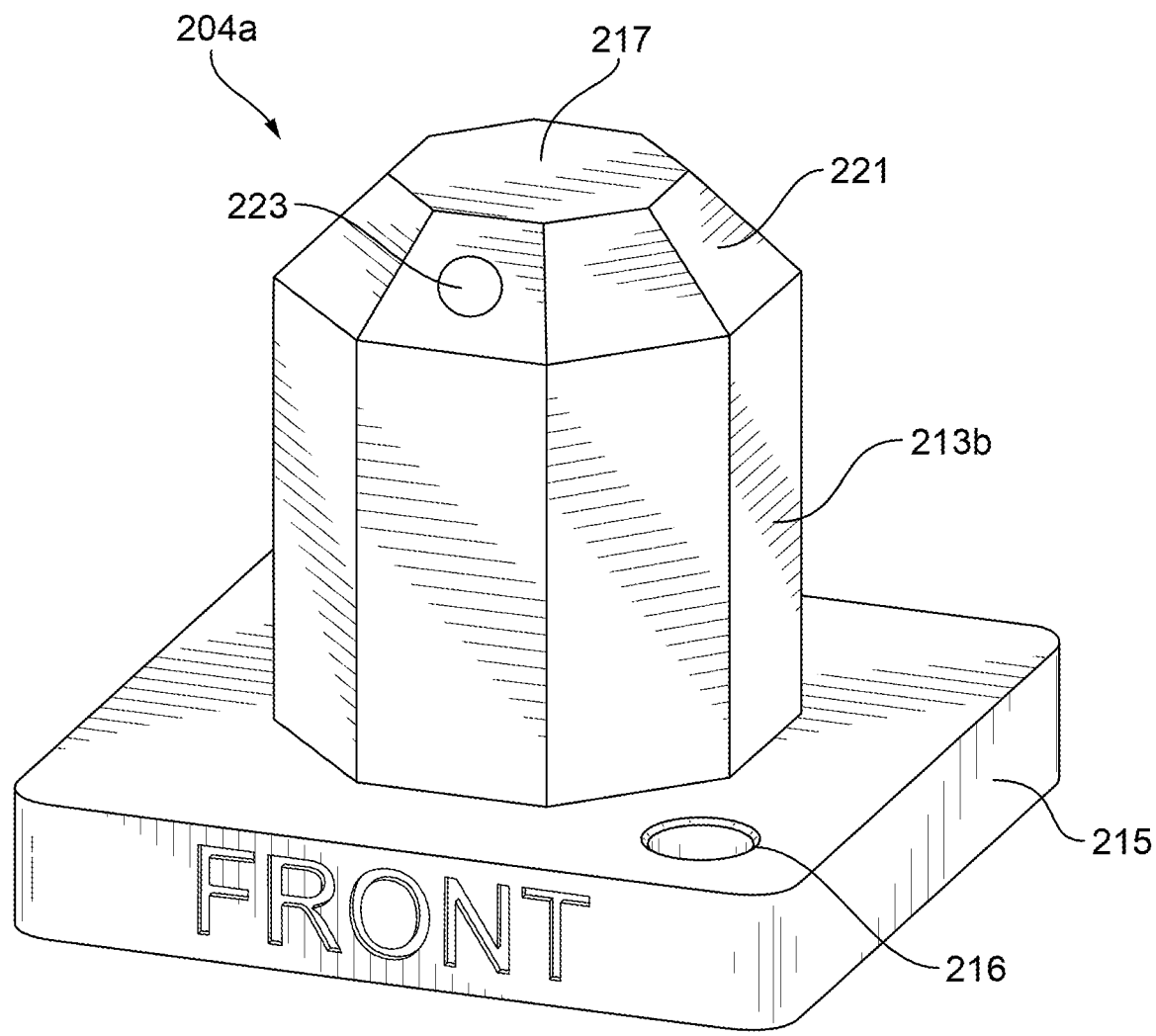
FIG. 3A is a perspective view of an embodiment of an artifact in accordance with this disclosure.
Figure 3B:
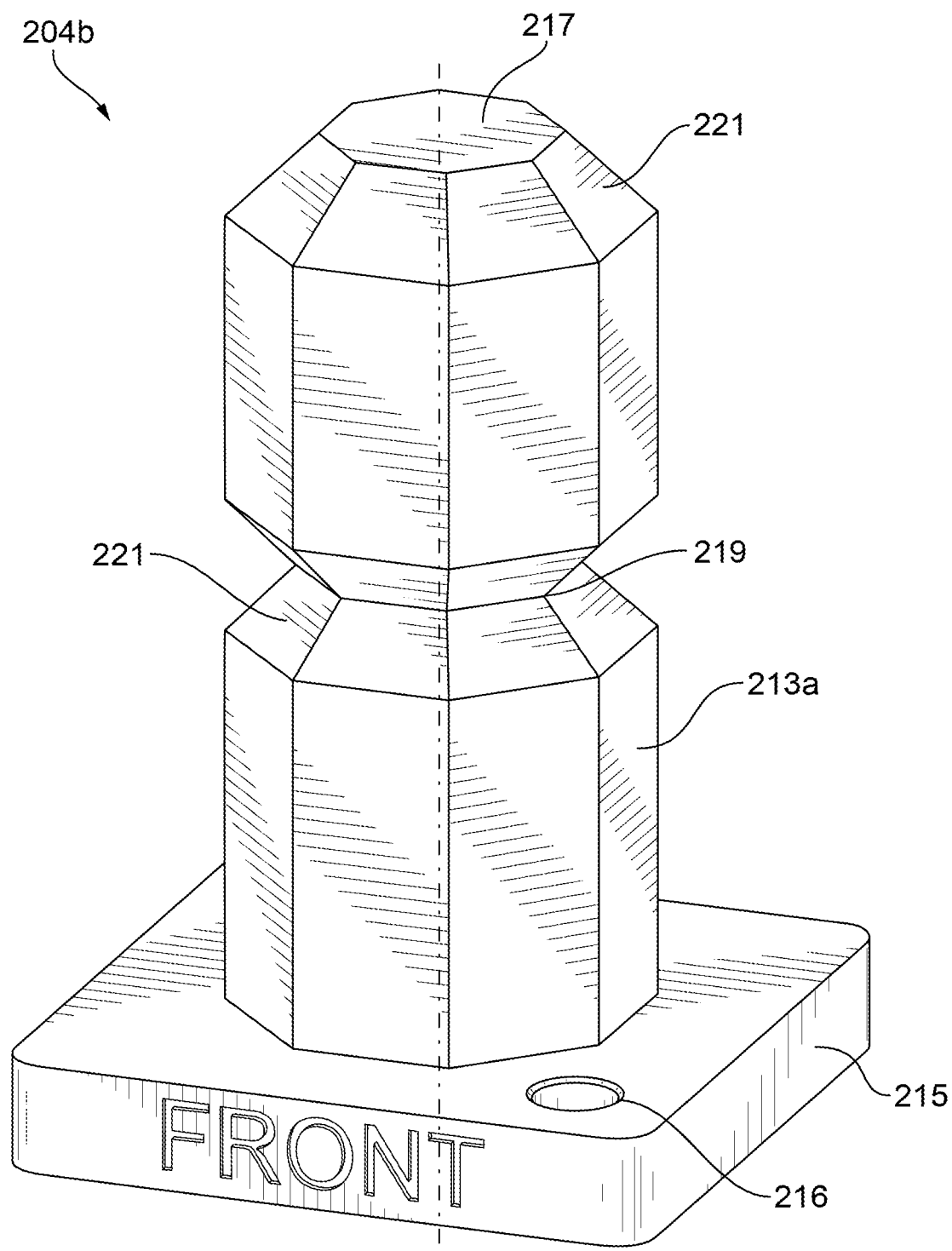
FIG. 3B is a perspective view of an embodiment of an artifact in accordance with this disclosure.
Figure 4A:
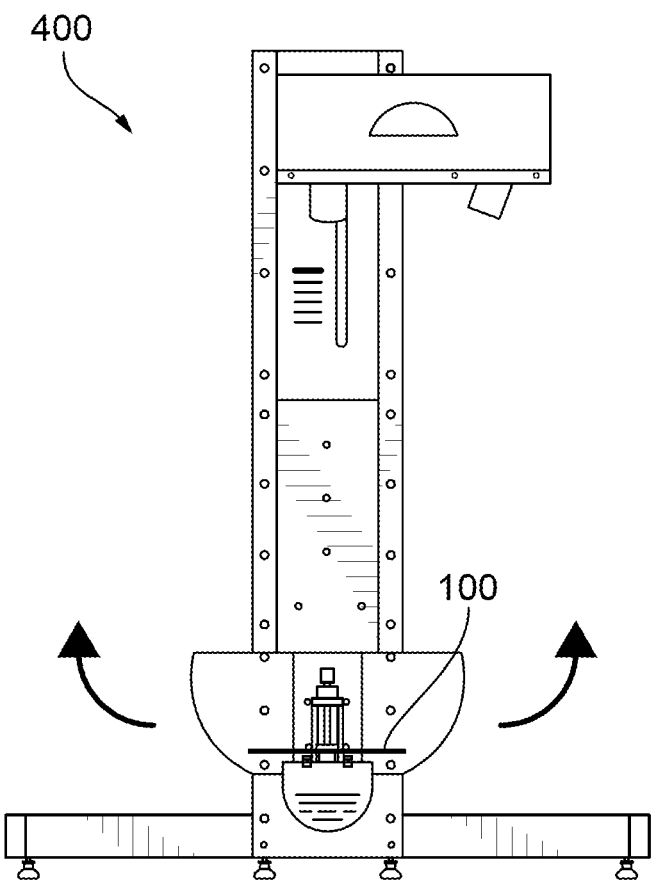
FIGS. 4A-4C are diagrams of various views of an embodiment of a 3D scanning system, shown utilizing the plate of FIG. 1 and indicating various directions of motion of the plate relative to the view of the imaging device.
Figure 4B:
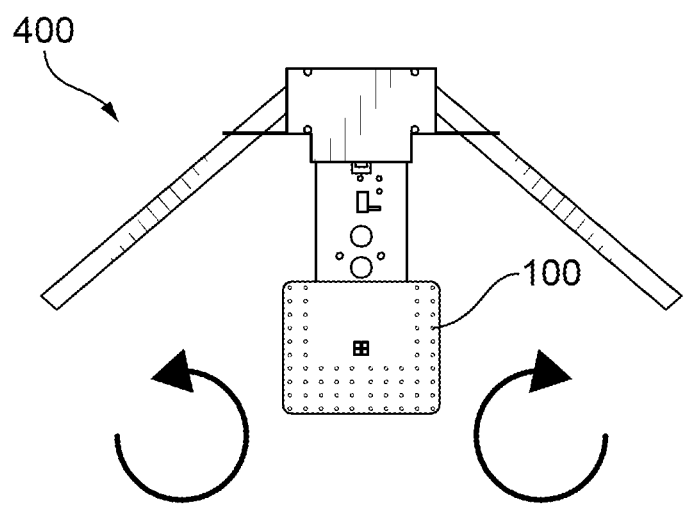
Figure 4C:
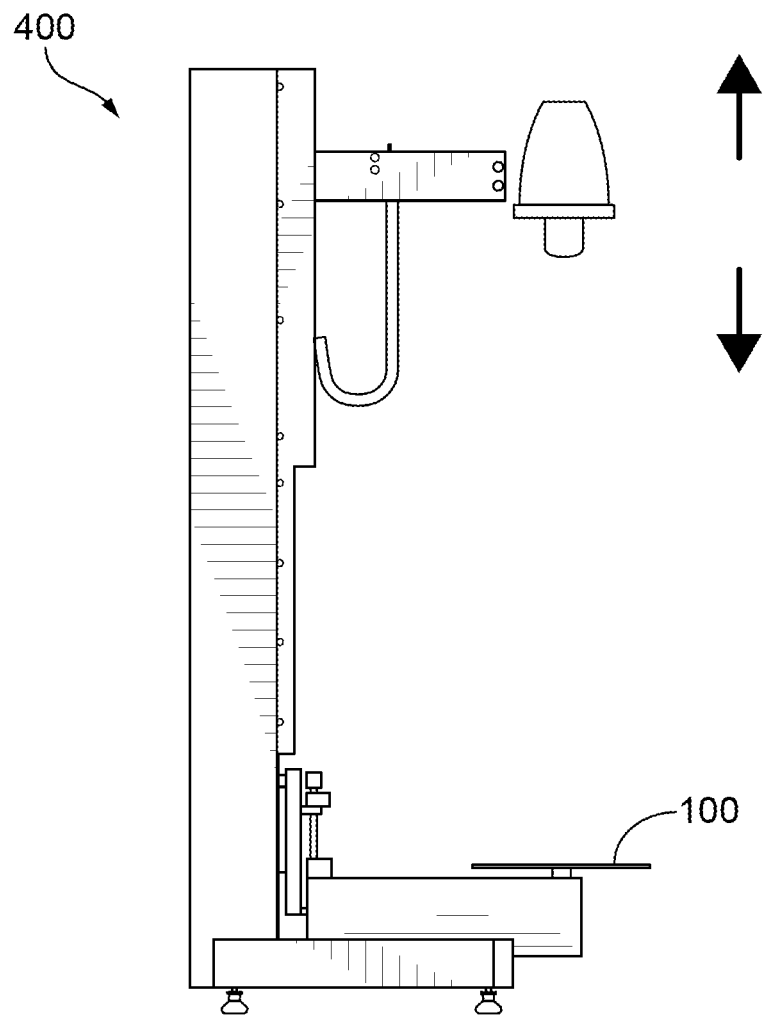

Referring to FIG. 1, a plate 100 for a 3D scanning system (e.g., as shown in FIGS. 4A-4C) can include a plate body 101 configured to mount to a 3D scanning system. The plate 100 can also include a plurality of artifact alignment apertures 103 defined in the plate body 101 and arranged in a predetermined pattern (e.g., a grid) to allow a predetermined mounting arrangement of one or more artifacts (e.g., artifacts 204a, 204b as shown in FIGS. 2, 3A, and 3B).

Figure 2:
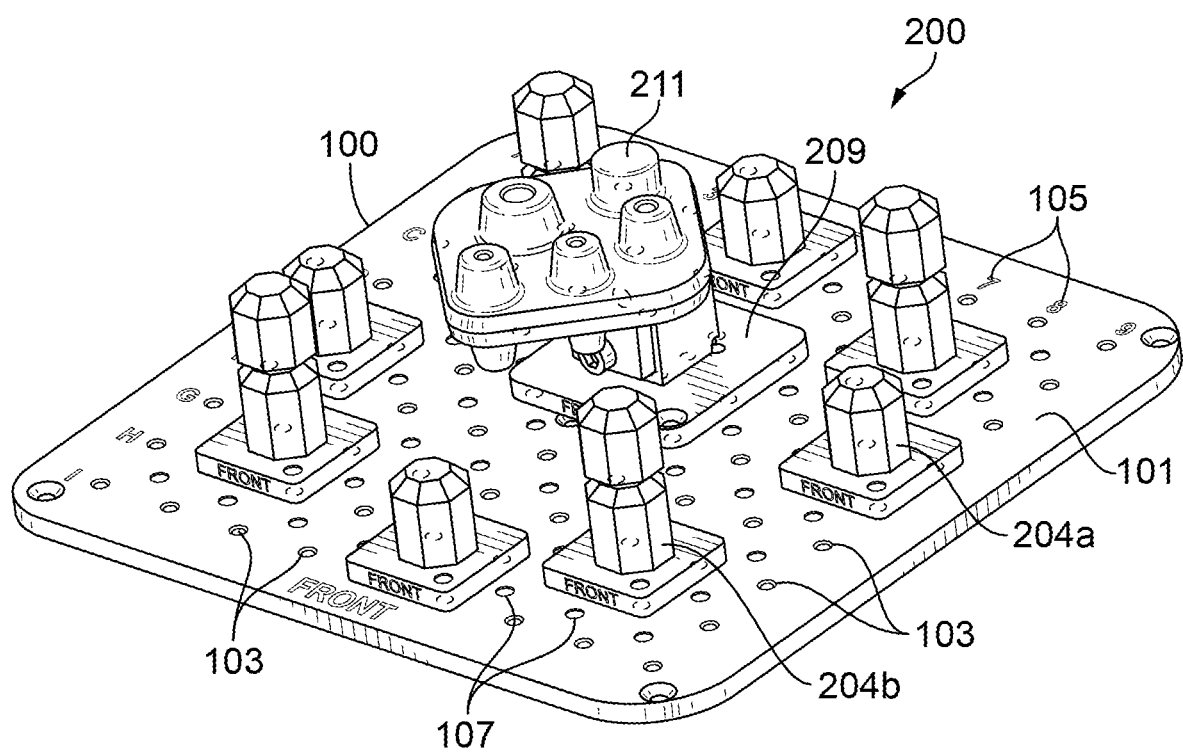
FIG. 2 is a perspective view of an embodiment of a system in accordance with this disclosure, shown utilizing the plate of FIG. 1 and having an embodiment of a part mounted thereto.

Referring additionally to FIG. 2, the artifact alignment apertures 103 are configured to allow an artifact to be mounted to the plate body 101. For example, the plurality of artifact alignment apertures 103 can include one or more dowel pin holes or any other suitable aperture (e.g., threaded or unthreaded) configured to receive a fastener and/or an attachment portion of an artifact 204a, 204b. The predetermined pattern of the artifact alignment apertures 103 can include a plurality of rows and columns as shown. Any other suitable pattern is contemplated herein.

The plate 100 can include position indices 105 on a surface of the plate body 101. The position indices 105 can be associated with at least one of the plurality of rows and/or columns as shown. In certain embodiments, the position indices 105 can include a plurality of letters for one of the plurality of rows or columns (e.g., rows as shown), and a plurality of numbers for the other of the plurality of rows or columns (e.g., columns as shown). The indices 105 associated with the pattern (e.g., the grid as shown) can be used so that successful set-ups relating to specific parts can be recorded so they can be repeated at a later date if needed, for example.

In certain embodiments, the plate 100 can include a plurality of mounting apertures 107 (e.g., threaded and/or any other suitable type of aperture) disposed in the plate body 101 and configured to allow mounting of one or more holding fixtures 209 (e.g., as shown in FIG. 2) and/or parts 211. The one or more of the plurality of mounting apertures 107 can be the same as or different from the alignment artifact apertures 103. As shown, in certain embodiments, the mounting apertures 107 can be disposed in a similar pattern as the alignment artifact apertures 103, but interspersed therebetween. The plate 100 can include one or more device attachment apertures 108 configured to allow the plate 100 to be attached to a 3D scanning machine (e.g., as shown in FIGS. 4A-4C).

Referring specifically to FIGS. 2, 3A, and 3B, in accordance with at least one aspect of this disclosure, a 3D scanning system 200 can include a plate 100 as described above. The system 200 can further include one or more artifacts 204a, 204b, e.g., attached to the plate body 101 (e.g., with pins, screws, glue, and/or any other suitable fastening method/device).

The system 200 can also include one or more holding fixtures 209 configured to hold a part 211 to the plate 100 during scanning. The one or more holding fixtures 209 can include any suitable shape, size, and/or mounting arrangement to allow the holding fixture 209 to hold one or more parts 211. The holding fixture 209 can be adjustable to fit to any suitable part shape and/or size.

At least one of the one or more artifacts 204a, 204b can include an artifact body 213a, 213b and a mounting flange 215. The mounting flange can include one or more mounting holes 216 configured to align with the alignment artifact apertures 103 and to allow mounting thereto using a suitable fastener and/or method as described above. In certain embodiments, as shown, the artifact body 213a, 213b can include a multi-sided post (e.g., an octagonal post or any other suitable number of sides). Any other suitable shape (e.g., cylindrical), size, and/or features are contemplated herein for one or more of the artifacts 204a, 204b.

One or more artifacts 204a, 204b can be made from aluminum or any other suitable material (e.g., to be light weight). One or more of the artifacts 204a, 204b can be anodized a particular color (e.g., black) which can cause the one or more artifacts 204a, 204b to not show in the scan data.

In certain embodiments, at least one of the one or more artifacts 204a, 204b can include a frustum tip 217. For example, as shown, the frustum tip 217 can include an octagonal frustum. Referring to FIG. 3B, in certain embodiments, at least one of the one or more artifacts 204a, 204b can include a mirrored frustum 219 defined in the artifact body 213b. The frustum tip 217 and/or the mirrored frustum 219 define a plurality of faces 221 that can be used to help a scanning device determine an orientation of the system 200 relative to the imagine device.

For example, referring to FIG. 3A, the one or more artifacts 204a, 204b can include an imaging target 223 (e.g., a sticker, a painted target) configured to allow imaging software to determine an orientation of the part 211 as a function of each imaging target 223 on each artifact 204a, 204b. The imaging target 223 can be any suitable target (e.g., a contrasted dot on face 221 as shown) as appreciated by one having ordinary skill in the art in view of this disclosure.

In certain embodiments, each artifact 204a, 204b on a plate 100 can include at least one imaging target 223. In certain embodiments, each face 221 and/or other suitable surface of each artifact 204a, 204b can include at least one imaging target 223. In certain embodiments, a plurality of targets 223 can be placed on artifacts 204a, 204b in random configurations. These targets 223 can be used by the scanner to mesh scan data together to create a scan of the entire desired part or feature as appreciated by those having ordinary skill in the art.

Referring to FIGS. 4A-4C, a scanning device 400 is shown including an embodiment of a plate 100 attached thereto. One or more parts mounted to a plate 100 can be moved into different orientations and scanned multiple times. Then, all scans can be meshed together to create a representation of the entire part. As shown, the scanning device 400 can move the plate (e.g., in an automated fashion) by tilting and rotating to achieve the required view for the camera. Any suitable embodiment of a plate 100 and/or system 200 as described above can be attached to the device 400.

In accordance with at least one aspect of this disclosure, a method for creating a 3D image of a part can include placing one or more artifacts (e.g., artifacts 204a, 204b) on a plate (e.g., plate 100), and mounting a part (e.g., part 211) to the plate in a predetermined location relative to the one or more artifacts. Placing the one or more artifacts and/or mounting the part can include using and/or recording indices (e.g., indices 105) on the plate that indicate a position of the one or more artifacts and/or the part.

As described above, embodiments can include one or more interchangeable artifacts containing targets that can be used by the scanner for scan-to-scan matching. These artifacts can be moved around into different configurations based on what is being scanned. By using such embodiments, one or more standard scanning programs can be created and/or utilized that will provide basic scan results without having to create a distinct program for each piece of prototype hardware, for example. One or more general holding fixtures can be created to hold multiple parts for scanning and can be moved to different locations on the fixture as well to accommodate different part configurations. Embodiments include targets that can be placed on the faces of the artifacts in order to make them visible to the scanner from many different orientations, for example. The scanner software can see these target dots (e.g., white dots contrasted on black), to understand orientation and to know how to stitch the images together to make a 3D image.

Embodiments as described above make scan-to-scan matching and setup more efficient. Embodiments of the holding fixture can be easily changed to accommodate different parts and can use a basic program to obtain scan data quickly without the need for making a new program for each part. In certain embodiments, setting artifacts and/or fixtures/parts up in a predetermined way on a grid allows repeatable set up for similar parts and stops the need to create software to interpret each type of device.

The methods and systems of the present disclosure, as described above and shown in the drawings, provide for scanning systems and methods with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A plate for a 3D scanning system, comprising:
   a plate body configured to mount to a 3D scanning system; and
   a plurality of artifact alignment apertures defined in the plate body arranged in a predetermined pattern to allow a predetermined mounting arrangement of one or more artifacts, wherein the artifact alignment apertures are configured to allow an artifact to be mounted to the plate body, wherein the predetermined pattern includes a plurality of rows and columns;
   one or more artifacts attached to the plate body;
   a plurality of mounting apertures disposed in the plate body configured to allow mounting of one or more holding fixtures and/or parts, wherein the mounting apertures are interspersed between the alignment apertures; and
   position indices on a surface of the plate body and associated with at least one of the plurality of rows and/or columns,
   wherein the mounting apertures are not in the plurality of rows and columns of the artifact apertures and are not indexed.

2. The plate of claim 1, wherein the position indices include a plurality of letters for one of the plurality of rows or columns, and a plurality of numbers for the other of the plurality of rows or columns.

3. A 3D scanning system, comprising:
   a plate for a 3D scanning system, comprising:
      a plate body configured to mount to a 3D scanning system;
      a plurality of artifact alignment apertures defined in the plate body arranged in a predetermined pattern to allow a predetermined mounting arrangement of one or more artifacts, wherein the artifact alignment apertures are configured to allow an artifact to be mounted to the plate body, wherein the predetermined pattern includes a plurality of rows and columns;
      one or more artifacts attached to the plate body;
      a plurality of mounting apertures disposed in the plate body configured to allow mounting of one or more holding fixtures and/or parts, wherein the mounting apertures are interspersed between the alignment apertures; and
      position indices on a surface of the plate body and associated with at least one of the plurality of rows and/or columns,
      wherein the mounting apertures are not in the plurality of rows and columns of the artifact apertures and are not indexed.

4. The system of claim 3, wherein the position indices include a plurality of letters for one of the plurality of rows or columns, and a plurality of numbers for the other of the plurality of rows or columns.

5. The system of claim 3, wherein at least one of the one or more artifacts includes an artifact body and a mounting flange.

6. The system if claim 5, wherein the artifact body includes a multi-sided post.

7. The system of claim 3, wherein at least one of the one or more artifacts includes a frustum tip.

8. The system of claim 7, wherein the frustum tip comprises an octagonal frustum.

9. The system of claim 3, wherein at least one of the one or more artifacts include a mirrored frustum defined in the artifact body.

10. The system of claim 3, wherein the one or more artifacts include an imaging target configured to allow imaging software to determine an orientation of the part as a function of each imaging target on each artifact.

11. A method for creating a 3D image of a part, comprising:
    placing one or more artifacts on a plate using a plurality of alignment apertures, wherein the plurality of artifact alignment apertures defined in the plate body arranged in a predetermined pattern to allow a predetermined mounting arrangement of one or more artifacts, wherein the artifact alignment apertures are configured to allow an artifact to be mounted to the plate body, wherein the predetermined pattern includes a plurality of rows and columns; and
    mounting a part to the plate in a predetermined location relative to the one or more artifacts using mounting apertures that are interspersed between the alignment apertures and position indices on a surface of the plate associated with at least one of a plurality of rows and/or columns, wherein the mounting apertures are not in the plurality of rows and columns of the artifact apertures and are not indexed.

12. The method of claim 11, wherein placing the one or more artifacts and/or mounting the part includes using and/or recording indices on the plate that indicate a position of the one or more artifacts and/or the part.

* * * * *